(12) United States Patent
Kuiper

(10) Patent No.: US 12,421,669 B2
(45) Date of Patent: Sep. 23, 2025

(54) METHOD AND SYSTEM FOR MANUFACTURING A 3-DIMENSIONAL FOOD PACKAGING UNIT FROM A MOLDED PULP MATERIAL AND SUCH FOOD PACKAGING PRODUCT

(71) Applicant: HUHTAMAKI MOLDED FIBER TECHNOLOGY B.V., Leeuwarden (NL)

(72) Inventor: Harald John Kuiper, Heerenveen (NL)

(73) Assignee: HUHTAMAKI MOLDED FIBER TECHNOLOGY B.V., Leeuwarden (NL)

( * ) Notice: Subject to any disclaimer, the term of this patent is extended or adjusted under 35 U.S.C. 154(b) by 1508 days.

(21) Appl. No.: 16/770,173

(22) PCT Filed: Dec. 5, 2018

(86) PCT No.: PCT/NL2018/050812
§ 371 (c)(1),
(2) Date: Jun. 5, 2020

(87) PCT Pub. No.: WO2019/112428
PCT Pub. Date: Jun. 13, 2019

(65) Prior Publication Data
US 2021/0164171 A1    Jun. 3, 2021

(30) Foreign Application Priority Data

Dec. 6, 2017 (NL) .................................... 2020028

(51) Int. Cl.
*D21J 3/00* (2006.01)
*B65D 65/46* (2006.01)
(Continued)

(52) U.S. Cl.
CPC .............. *D21J 3/00* (2013.01); *B65D 65/466* (2013.01); *B65D 85/324* (2013.01); *D21B 1/30* (2013.01);
(Continued)

(58) Field of Classification Search
None
See application file for complete search history.

(56) References Cited

U.S. PATENT DOCUMENTS 8,833,681 B2 *   9/2014   Tarverdi .................. D21B 1/32
                                                    241/24.19
2016/0257486 A1   9/2016   Kuiper et al.
2016/0348318 A1 * 12/2016  Koenig .................. D21H 19/54

FOREIGN PATENT DOCUMENTS

WO       2010149711 A2      12/2010
WO       2012130957 A1      10/2012
WO    WO-2016130006 A1 *     8/2016   ........... B65D 85/324

OTHER PUBLICATIONS

Martinez et al.; Computers & Industrial Engineering 98; 554-566; 2016.*

* cited by examiner

*Primary Examiner* — Guinever S Gregorio
(74) *Attorney, Agent, or Firm* — Banner & Witcoff, Ltd.

(57) ABSTRACT

The present invention relates to a method and system for manufacturing a 3-dimensional packaging material form a moulded pulp material and such packaging unit. The method of the invention comprises the steps of: —preparing a pulp material, comprising the steps of: —providing an amount of biomass with non-wood biomass fibers as a raw material; preparing the biomass fibers; fibrillation of the prepared biomass fibers with an extruder to produce the pulp material with biomass fibers; providing the pulp material to the moulding device; moulding the 3-dimensional food pack- (Continued)

aging unit; and releasing the 3-dimensional food packaging unit from the mould.

17 Claims, 7 Drawing Sheets

(51) Int. Cl.
 *B65D 85/32* (2006.01)
 *D21B 1/30* (2006.01)
 *D21C 9/00* (2006.01)
(52) U.S. Cl.
 CPC ........ *D21C 9/007* (2013.01); *B65D 2565/383* (2013.01)

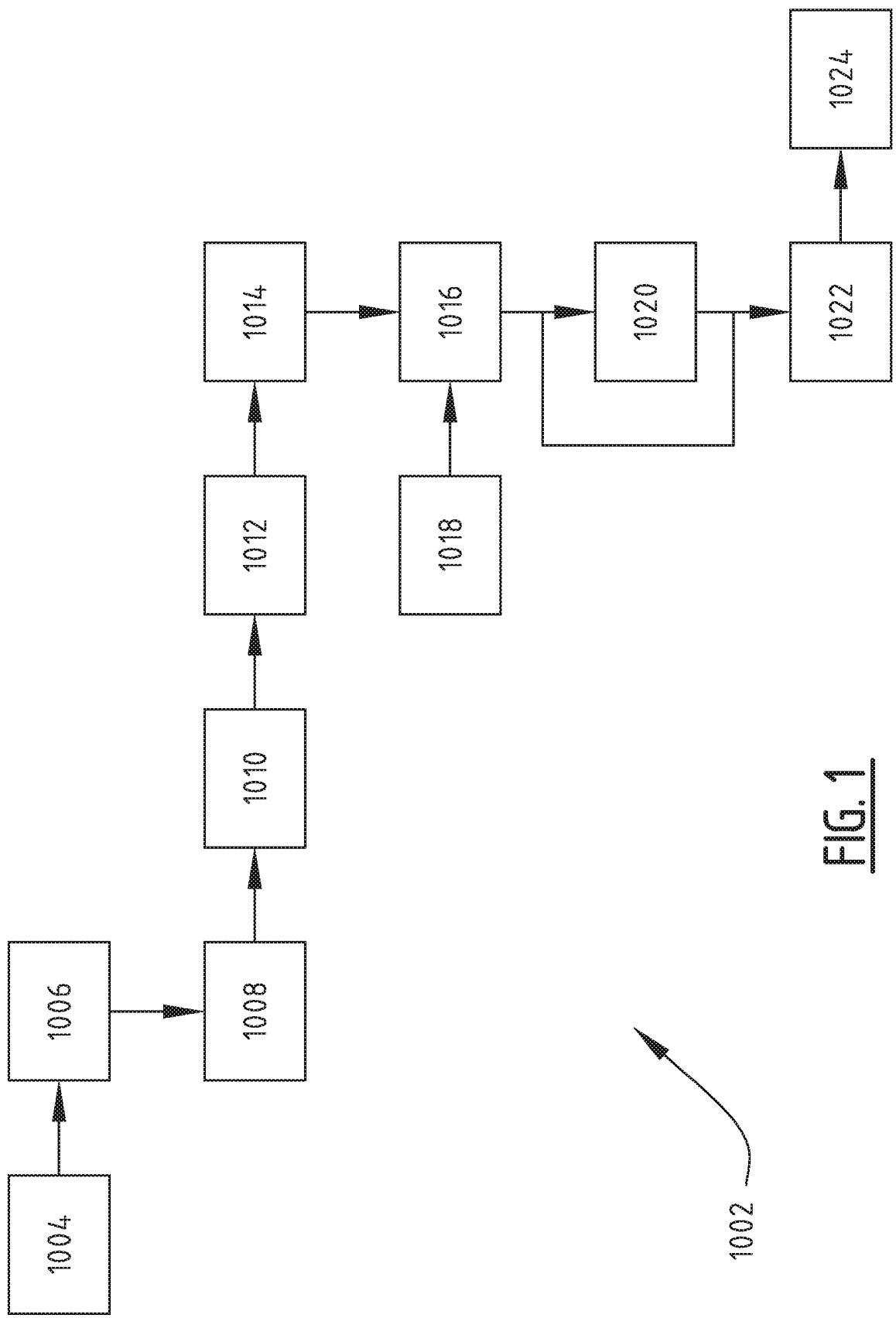

METHOD AND SYSTEM FOR MANUFACTURING A 3-DIMENSIONAL FOOD PACKAGING UNIT FROM A MOLDED PULP MATERIAL AND SUCH FOOD PACKAGING PRODUCT

RELATED APPLICATION DATA

This application is a National Stage Application under 35 U.S.C. 371 of PCT application number PCT/NL2018/050812 designating the United States and filed Dec. 5, 2018; which claims the benefit of NL application number 2020028 and filed Dec. 6, 2017; each of which is hereby incorporated by reference in its entirety.

The present invention relates to a method and a system for manufacturing a 3-dimensional food packaging product from a moulded fiber product. Such moulded fiber product may comprise packaging products, such as packaging units for eggs and similar products like kiwi's and tomatoes, for example.

Conventional food packaging products are made from moulded fiber material originating from a paper material also referred to as paper pulp. Such conventional food packaging can be used as an egg packaging unit to transport and display eggs on shelves in supermarkets, for example. Consumers do not always appreciate the attractiveness or esthetical appearance of such packaging unit.

A further problem with conventional food packaging units that are manufactured from a moulded fiber product is the reduced availability of recycled paper material that can be used to prepare the pulp material. There is an increased need for alternative food packaging units that are made from an alternative material to obviate or at least reduce the need for recycled paper material and/or virgin wood fibers, while providing an alternative food packaging unit that fulfils the needs of consumers relating to attractiveness, esthetical appearance and sustainability.

The present invention has for its object to obviate or at least reduce one or more of the above stated problems in conventional methods for manufacturing a 3-dimensional food packaging unit from a moulded pulp material, such as an egg packaging, wherein the method according to the invention comprises the steps of:
  preparing a pulp material, comprising the steps of:
    providing an amount of biomass with non-wood biomass fibers as a raw material;
    preparing the biomass fibers;
    fibrillation of the prepared biomass fibers with an extruder to produce the pulp material with biomass fibers;
  providing the pulp material to the moulding device;
  moulding the 3-dimensional food packaging unit; and
  releasing the 3-dimensional food packaging unit from the mould.

The present invention provides a 3-dimensional food packaging unit from a moulded pulp material, with the packaging unit comprising a food receiving or carrying compartment. The food packaging unit according to the invention comprises a compartment capable of receiving or carrying a food product. For example, a food receiving compartment may relate to a compartment capable of holding a food product, such as eggs, tomatoes, kiwis, or a container for holding a beverage. A carrying compartment may relate to a carrier surface whereon or wherein a food product can be placed, such as a plate, bottle divider etc.

To prepare a pulp material an amount of biomass is provided. Preferably, this biomass at least partially, and preferably substantially, originates from a non-wood material, preferably so-called non-wood lignocellulosic biomass. This biomass improves the natural feel and sustainability of the food packaging unit that is manufactured from the method according to the invention.

Furthermore, by using a pulp material that at least partially originates from a non-wood biomass reduces the need for the use of so-called wood biomass fibers that originate from trees. This applies both to so-called virgin fibers and recycled fibers.

According to the invention, the biomass, in particular the biomass fibers therein, are prepared. This may involve one or more pre-treatments steps such as seaving, washing, filtering and dewatering, for example. Furthermore, in a presently preferred embodiment the fibers are cut to a cut length in a range of 2-6 cm, preferably about 4 cm.

In a next step, the prepared biomass fibers are fibrillated with an extruder to reduce the pulp material of biomass fibers. By fibrillating the non-wood biomass fibers with an extruder, such as a screw extruder or (counter-rotating) twin-screw extruder, the fibrillation of the biomass fibers, including the non-wood biomass fibers, produces a pulp material of biomass fibers having an increased internal fiber surface that increases hydrogen bonding and show an associated increase of interlinking between the individual fibers. The extrusion process transforms the fibers of the biomass into a 3-dimensional interlinked structure. Surprisingly, due to the improved strength and stability, the pulp material can be used for moulding a 3-dimensional packaging unit, such as an egg packaging unit. This moulding involves providing the pulp material to the moulding device, performing the moulding operation and releasing the unit from the mould. The moulding involves a drying operation that can be performed by in-mould drying or can be performed in a separate drying step after the release from the products to the mould. Furthermore, the extruder enables providing and preferably steering of a fiber length distribution in the biomass material. This enables controlling the packaging unit characteristics, such as strength, stability and visual appearance. Optionally, more than one, such as two or more, extruders can be used to further improve the possibilities for steering the fiber length distribution. Optionally, different biomass materials are provided to the individual extruders and the resulting material is mixed before being provided to a moulding step, for example. This further increases the operational flexibility of the manufacturing process as a whole.

In a presently preferred embodiment the extruder comprises different zones. These zones may involve fibrillation, pressing, optionally addition of other components/ingredients, such as bleaching agents for example, and heating of the biomass material. Heating may assist in opening cell walls, for example. Optional, the extruder comprises a zone that enables flushing the biomass material to enhance nutrient removal. By-products may include protein and/or fatty acids. By-products can be used for biogas production that optionally may provide energy to the manufacturing process, for example the drying operation. This reduces the carbon footprint.

As a further advantage of the method according to the invention the produced pulp material can be stored, transported and/or directly used for the watering/moulding operation. For example, the fluffy pulp material may be stored and transported in so-called big bags or any other suitable container and/or can be distributed by wet lap and/or dry baling facilities up to 90 or even 95% dryness. This provides a high flexibility in the production process of the packaging units.

A further effect of the method according to the invention was shown in further tests that showed a reduction in smell and dust production. This improves working conditions and reduces possible nuisances in the surroundings of the manufacturing process. In addition, these further tests showed an improved denesting of the manufactured products. In an embodiment according to the invention the 3-dimensional packaging unit that is at least partially produced from non-wood biomass fibers comprises a cover part having a length, a width and a depth, with the cover part being configured for engaging the bottom part, wherein the cover part may comprise reinforcement elements to increase stability of the packaging unit. Preferably, the cover part comprises top, front, side and rear surfaces with the front surface preferably comprising one or more openings configured for receiving the first locking element, such as a notch, cam or protrusion provided on the bottom part, in a closed position of the packaging unit. Having a packaging unit with a bottom part and a cover part enables transport and display of products without damaging the products. The bottom and/or top part have a product receiving or carrying compartment that preferably has a shape that resembles the outside contours of the product. This is especially relevant in case of vulnerable products like eggs. Preferably, the food packaging unit according to the invention comprises a compartment capable of receiving or carrying a food product. For example, a food receiving compartment may relate to a compartment capable of holding a food product, such as eggs, tomatoes, kiwis, or a container for holding a beverage. A carrying compartment may relate to a carrier surface whereon or wherein a food product can be placed, such as a plate, bottle divider etc. In a preferred embodiment, the cover part is hingedly connected to the bottom part with a hinge-element on the rear side thereof. On the front side a lock is provided comprising the first locking element on the bottom part and an opening in the cover part as second locking element that is configured for receiving the first locking element.

In a preferred embodiment of the invention preparing the pulp material of biomass comprises the step of providing the biomass from silage with a dry matter content in a range of 35-50%, preferably in a range of 30-40%.

The provided biomass fibers, more particularly non-wood biomass fibers, are dried in silage. By providing stored and dried non-wood biomass from silage to the manufacturing process the effects of the protein content in the biomass material are significantly reduced. It is known that high protein content may hinder dewatering, increases foaming and odour production. Also, high protein content may reduce the (hydrogen) bonding in the material, thereby possibly reducing the strength/stiffness of the final packaging unit. By using material that preferably at least partially comes from silage, and is preferably pre-washed, the adverse protein effects are significantly reduced.

The method of the invention therefore reduces the aforementioned negative effects of high protein content. It is assumed that this is caused by the drying of the biomass material in silage. Using this material in a manufacturing process provides a packaging unit with a higher stiffness as the negative protein effects have been reduced. This improves the possibilities to provide a 3-dimensional food packaging product, such as egg packaging, that is sufficiently strong to withstand the loads acting on the packaging units when storing, transporting an displaying the packaging unit. Also, the manufactured packaging products are capable of dealing with the different conditions to which they are exposed, including cold storage room conditions and outside air conditions, thereby providing a flexible food packaging unit.

Preferably, preparing the biomass fibers comprises the steps of washing the biomass fibers and dewatering the washed biomass fibers.

The dewatering preferably comprises a (preliminary) dewatering step and a pressing step. The dewatering step can be performed with an inclining dewatering screw, for example. The pressing step can be performed by using a screw press. It will be understood that other dewatering and pressing methods can also be envisaged.

Preferably, after the (preliminary) dewatering step the dry matter content is in a range of 10-20 wt %, preferably about 15 wt %.

Preferably, in a combination of the pressing step and the dewatering step, the dry matter content after the pressing step is preferably in a range of 20-40 wt %, more preferably in a range of 25-35 wt %.

In a preferred embodiment according to the invention, the extruding of the prepared biomass fibers comprises the step of flushing the fibers.

Incorporating a flushing step in the extrusion enables removal of at least a part of the proteins, fatty acids etc. from the pulp. Removing or at least reducing the amount of these components in the pulp material improves the manufacturing process, and the strength and stability of the end product. This flushing step can be achieved by incorporating one or more flushing units and/or dewatering units in the extruder.

Experiments showed a significant increase of production capacity with about 5-10% as compared to conventional manufacturing processes for manufacturing food packaging units from a moulded pulp material with biomass fibers. This enables providing a packaging unit that is more cost effective and can be manufactured more efficiently. Also, the printability of the packaging unit is improved.

A further effect of the flushing is the further reduction of smell from the end products, reduction of the risk that the smell is transferred to other products on the same of adjacent production lines, and reduction of the smell in the process waste water. This is caused by removal of components from the pulp material, such as the fatty acids. Furthermore, the flushing also further reduces the amount of dust in the production facility. This contributes to an improvement of the overall process conditions.

Preferably, the extruding of the prepared biomass fibers comprises the step of collecting the residual material. The residual material may result from a flushing step, for example. In a presently preferred embodiment the residual material is supplied to a reactor configured for producing biogas, for example by performing an anaerobic digestion process that produces biogas, digestate and water. The biogas can be used directly in the manufacturing process feeding the burners in the drying operation and/or can be used to produce electricity. The direct use of biogas for burners may require removal of sulphur components from the biogas with a scrubber, for example. This direct use of biogas and/or production of electricity improve the carbon foot print of the end product and reduces the environmental impact of the manufacturing process. The digestate can (partly) be used as fertilizer, for example.

The fibrillation of the prepared biomass fibers, preferably including an amount of non-wood biomass fibers, provides pulp material having a dry matter content in a range of 50-95 wt %, preferably in a range of 60-90 wt %. This fibrillation is preferably performed in an extruder, such as a counter-rotating twin screw extruder. In this extruder different processes take place, for example (partially) melting of the lignine and denaturalizing of protein. The extrusion process uses an amount of about 300 kW, preferably less. Optionally, the pulp material form the extruder is mixed with recycled paper fibers or virgin wood fibers in the extruder or is mixed later with the pulp material. The protein that was originally present in the biomass may remain in the produced pulp material. It, however, does not have a negative effect on the final packaging unit, or the negative effects are at lease significantly reduced. In fact, the combination of the silage process with the extrusion process surprisingly neutralizes the proteins and their adverse effects on the quality of the final moulded packaging unit. This improves the quality of the final end-product and obviates or at least reduces the need for additional process steps that are directed to removal of proteins.

In a presently preferred embodiment the protein content in the produced pulp material is in a range of 1-20 wt %, preferably in a range of 3-15 wt %, and most preferably in a range of 5-15 wt %. Dry protein content can be derived by measuring the Nitrogen-Kjeldahl content with e.g. a Buchi N-Kjeldahl lab analysis. From the N-Kjeldahl analysis the protein content in the original biomass sample or packaging can be calculated.

In a presently preferred embodiment of the invention, the biomass relates to biomass of plant origin that preferably involves plants from the order of Poales including grass, sugar cane, bamboo and cereals including barley and rice. Other examples of biomass of plant origin are plants of the order Solanales including tomato plants of which the leaves and/or stems could be used, for example plants from the Order Arecales including palm oil plants of which leaves could be used, for example plants from the Order Maphighiales including flax, plants from the Order of Rosales including hemp and ramie, plants from the Order of Malvales including cotton, kenaf and jute, for example plants from the order Vitales including vine (stems). Alternatively, or in addition, biomass of plant origin involves so-called herbaceous plants including, besides grass type plants and some of the aforementioned plants, also jute, Musa including banana, Amarantha, hemp, cannabis etcetera, preferably, the (lignocellulosic) biomass of plant origin comprises biomass originating from plants of the Family of Poaceae (to which is also referred to as Gramineae). This family includes grass type of plants including grass and barley, maize, rice, wheat, oats, rye, reed grass, bamboo, sugar cane (of which residue from the sugar processing can be used that is also referred to as bagasse), maize (corn), sorghum, rape seed, other cereals, etc. In one of the presently preferred embodiments of the invention the biomass comprises straw/reed based fibers or even natural grown non-wood derivatives.

In a presently preferred embodiment according to the invention the biomass comprises rape seed (straw), especially the remaining plant material after harvesting the seeds, and/or natural grass.

The rape seed or rape seed material that is used in the manufacturing process for a packaging unit is preferably collected when harvesting the seeds. The natural grass or nature grass may originate from a natural landscape, for example. This rape seed and/or grass material has shown good manufacturing possibilities in combination of providing a sustainable product with a desired visual appearance to the consumer.

Experiments showed that the processes in the extruder with biomass material that comprises an amount of rape seed/rape seed material prevents the protein almost completely dissolving in the process liquid and thereby hindering the dewatering of the packaging unit. It is presently believed that the protein to some extent "sticks" to the fiber material and does not, or at least to a lesser extent, dissolves in the process liquid. This improves the dewatering and the overall manufacturing efficiency. For example, this fixation of (a part of) the protein enables operating the manufacturing process of the invention at a higher production rate. In addition, dewatering is not hindered, thereby improving the drying operation of the moulded product such that energy requirements are reduced. These effects can be enhanced by operating the extruder at an increased temperature to improve the denaturation of the protein.

This family of plants with rape seed and grass has not only shown good manufacturing possibilities, it also enables providing a sustainable product to the consumer.

In one of the presently preferred embodiments a combination of rape seed, natural grass and optionally an amount of recycled and/or virgin wood fibers is used. The rape seed material provides sufficient strength and stability to the packaging unit and the natural grass improves the visual appearance of an egg packaging, for example. In a presently preferred embodiment the natural grass is used having a relatively long fiber length to provide the packaging unit with visible grass fibers, and the rape seed is used having a relatively short fiber length to provide the packaging unit with sufficient strength. It will be understood that other combinations can also be envisaged in accordance with the present invention.

Preferably, at least 80 wt %, more preferably at least 90 wt %, more preferably at least 95 wt % of the biomass material originates from non-wood biomass fibers, preferably rape seed and/or natural grass. This significantly reduces the carbon footprint of the manufactured packaging units. Most preferably, the present invention enables manufacturing a 100% non-wood based product, preferably a 3D packaging product. It would even be possible to obviate the need to use mineral oils in the printing inks that are used to provide a buyer/user of the packaging units with relevant information, such that a fully mineral free packaging unit can be provided. This even further enhances the sustainability performance of the packaging unit and/or further reduces the carbon footprint of these packaging units.

In a further preferred embodiment according to the present invention the biomass comprises Miscanthus, preferably as an alternative or in combination with natural grass and/or rape seed.

The use of Miscanthus in the biomass material provides additional strength to the final mould fiber product. Optionally, the biomass material substantially comprises Miscanthus. Alternatively, Miscanthus is mixed with other biomass material. Also, the biomass material, optionally including a mixture of natural grass and Miscanthus, is mixed with paper pulp for the manufacture of moulded fiber products, such as egg packaging units. Miscanthus has relatively long fibers with a relatively high cellulose content of up to 85%. Pre-treatment may involve a refinement step.

In some of the presently preferred embodiments the 3-dimensional packaging unit comprises additional reinforcement elements, such as ribs, grooves, protrusions, etc., to improve the mechanical properties including strength, stability, tensile strength, three-point bending stiffness and compression etc. This may further enhance the use of a higher amount of (non-wood) biomass. More specifically, this enables the use of an amount above 80 wt. %, more preferably above 85 wt. % is possible. Preferably, the use of reinforcement elements allows for the use an amount above 92.5 wt. %. This provides a sustainable packaging unit with a natural feel and has good mechanical properties both in the manufacturing process and its actual use. Optionally, the method of the invention comprises the further step of providing the biomass fibers by mixing non-wood biomass fibers and virgin wood fibers.

In a presently preferred embodiment the biomass of plant origin is responsible of 10 wt % of the moulded pulp fiber product, preferably at least 20 wt %, more preferably at least 50 wt %, even more preferably at least 80 wt %, even more preferably at least 85 wt %, and most preferably at least 92.5 wt. %. Preferably, this biomass of plant origin comprises so-called non-wood biomass, more particularly non-wood lignocellulosic biomass. This further improves the natural feel and sustainability of the resulting packaging unit. Optionally, in a presently preferred embodiment, the biomass pulp comprises 25-75 wt % natural grass, 0-50% Miscanthus and paper pulp. In a further optional step, the method further comprises the step of adding potato fibers to the pulp material. By providing additional potato fibers to the pulp material the final strength of the packaging product is increased. Preferably, fibers resulting from the potato starch extraction process in the starch industry are added to the slurry. The potato skin is removed during this extraction process, and the residual waste stream comprising of potato skin fibers still contains native potato starch granules that can be mixed with biomass and/or paper fibers in the moulded fiber production process. In the pulp mixing step, and the drying step following the moulding step, the starch granules tend to gelatinize and enhance the fiber-fiber bonding with improved product stiffness as a result. Therefore, preferably the potato slurry comprises potato skin fibers with residual starch granules. Tests have shown a 5-15% increase in mechanical properties like tensile strength, burst index, 3 point bending stiffness and compression strength etc. Optionally, the potato fibers are mixed with Miscanthus and a natural grass. This mixture can be mixed with conventional paper pulp after which the final mixture is used for manufacturing the packaging unit.

In a further preferred embodiment of the invention the method comprises the step of providing an amount of a biodegradable aliphatic polyester.

The biodegradable aliphatic polyester can be mixed in the original moulded pulp material such that it is distributed over substantially the entire food packaging unit and/or can be provided as a separate layer on the side of the food packaging unit that may come into contact with a food product, for example. Providing the food packaging unit with an amount of a biodegradable additive, mixed into the pulp matrix and/or provided as a separate film layer, may improve product characteristics, such as barrier properties. For example, this may enable the use of non-wood biomass for food packaging units carrying instant meals, beverages etc. Preferably, this also renders the food packaging unit compostable.

In the context of this invention degradable relates to degradation resulting in loss of properties, while biodegradable relates to degradation resulting from the action of microorganisms such as bacteria, fungi and algae. Compostable relates to degradation by biological process to yield $CO_2$, water, inorganic compounds and biomass.

The food packaging unit according to a preferred embodiment of the invention is compostable thereby providing a sustainable packaging unit. This provides a biodegradable alternative material to plastics, for example. This improves recycling properties of the packaging units that are made from moulded pulp (including so-called virgin fiber material and/or recycled fiber material) and comprise a biodegradable aliphatic polyester.

A further advantage of adding an amount of biodegradable aliphatic polyester is that the packaging unit can also be decomposed using microorganisms in soil, for example. This enables decomposing the food packaging unit, comprising a biodegradable aliphatic polyester, as a whole. In such preferred embodiment, the food packaging unit can even be decomposed at home, thereby rendering the food packaging unit home-compostable. Such home-compostable packaging unit further improves the overall sustainability of the packaging unit of the invention. This enables replacing the use of less sustainable materials, such as CPET, PP, PE, PS, aluminium in food packaging units.

As mentioned one advantage of using a biodegradable aliphatic polyester according to an embodiment of the present invention is the improvement of barrier properties. Barrier properties may include oxygen and/or grease barriers. Also, the penetration of oil originating from the food product, such as pasta or French fries, into the food packaging unit can be reduced. Furthermore, in the production of (Chinet) disposable tableware the fluorine chemistry can be reduced or even omitted from the manufacturing process. Also, water barrier properties can be improved to reduce the penetration of water into the packaging unit and thereby reducing ridging problems, for example.

Another advantage when using a biodegradable aliphatic polyester in a food packaging unit is the constancy of size or dimensional stability.

As a further advantage of the use of a biodegradable aliphatic polyester, the so-called heat seal ability of the packaging unit is improved. This further improves food packaging characteristics.

An even further advantage of introducing an amount of a biodegradable aliphatic polyester in a food packaging unit is that the properties of the packaging unit can be adjusted by mixing or blending the main biodegradable aliphatic polyester with other polymers or agents. Also, it is possible to prepare the biodegradable aliphatic polyester material for (paper) coating and printing. Furthermore, in some embodiments, digital printing may be applied to the laminated trays to reduce the total cost of the packaging unit. This further improves the sustainability of the packaging unit. Also, a paper look may be achieved.

A further effect that is achieved with the packaging unit according to the invention is the improved insulation. This improves the so-called "cool-to-touch" characteristic of the packaging unit. This is beneficial when heating the unit in an oven or microwave, for example. This prevents a consumer from being injured when removing a packaging unit from the oven. More specifically, "cool-to-touch" relates to an outside packaging temperature in the range of 10-30° C. after heating the product in an oven, for example. This is a lower temperature as compared to conventional CPET packaging units, for example. Therefore, the packaging unit according to the invention is more safe in use. In addition, the wipe ability (cleaning possibilities in particular for cleaning/wiping the outer surface of the packaging unit) was improved, and more possibilities for masking (hiding) undesirable stains and/or promoting the compostable effect of the packaging unit were achieved.

In one of the presently preferred embodiments of the invention, the amount of biodegradable aliphatic polyester in the food packaging unit is in a range of 0.5-20 wt. %, more preferably in the range of 1-15 wt. %.

By applying an amount of biodegradable aliphatic polyester in one of the aforementioned ranges, the sustainability and packaging characteristics of the food packaging unit according to the present invention is significantly improved.

In a further preferred embodiment of the invention the amount of biodegradable aliphatic polyester is in the range of 2-10 wt. %, preferably in the range of 5-9 wt. %, and most preferably in the range of 6.5-8 wt. %.

Applying an amount of biodegradable aliphatic polyester in these ranges provides packaging units that are both stable and strong. Preferably, the material is sufficiently refined to further enhance the desired characteristics, preferably in an extrusion process as mentioned earlier. Especially, applying a refining energy of about 150 kWh/ton material showed a good effect in the mentioned range(s) of biodegradable aliphatic polyester. As a further effect, an overall weight reduction of the packaging unit can be achieved of up to about 20% without affecting the strength and stability of the packaging unit as compared to conventional products, such as CPET or PP trays or the like.

Preferably, the biodegradable aliphatic polyester comprises an amount of one or more of PLA, PBS, PHB, PGA, PHA, PCL, PHBV and/or PHBH. Preferably, the use of biodegradable aliphatic polyester is combined with the use of further additives or substances that aim at improving or achieving specific properties of the packaging unit. In further presently preferred embodiments the bio-polymers that are applied originate from so-called non-gmo (non-genetically modified organisms) biopolymers.

For example, it was shown that the use of PLA, optionally in addition to another biodegradable aliphatic polyester, may improve the strength and stability of the packaging unit, thereby providing a stronger packaging unit and/or requiring less raw material.

According to one of the preferred embodiments of the invention the biodegradable aliphatic polyester comprises an amount of polybutylene succinate (PBS). PBS is one of the biodegradable aliphatic polyesters. PBS can also be referred to as polytetramethylene succinate. PBS decomposes naturally into water, $CO_2$ and biomass. The use of PBS as a compostable material contributes to providing a sustainable product.

The use of PBS is possible in food-contact applications including food packaging units from a moulded pulp material. An advantage of the use of PBS is that the decomposition rate of PBS is much higher as compared to other agents or components such as PLA (including variations thereof such as PLLA, PDLA and PLDLLA, for example).

Therefore, the use of PBS in a food packaging unit from moulded pulp significantly improves the sustainability of the packaging unit. This improves recycling possibilities and biodegrading or decomposing the packaging unit. For example, the use of PBS in lid seals may obviate the need for non compostable PE as inner liner.

Preferably, in one of the embodiments of the invention the packaging unit comprises an amount of micro fibrillated cellulose (MFC) sometimes also referred to as nanofibrillar cellulose or cellulose nanofibers as an alternative to or in combination with the aforementioned aliphatic polyester(s). MFC preferably originates from cellulose raw material of plant origin. The use of MFC enhances the fiber-fiber bond strength and further improves the reinforcement effect. Although MFC is preferably applied in combination with one or more of the biodegradable aliphatic polyesters, it is also possible to use MFC as an alternative to these components.

In an embodiment of the invention the bio-polymers and/or MFC provide a biofilm on or at (a part of) the surface of the packaging unit. Experiments indicate that good barrier properties can be achieved. Alternatively, or in addition thereto, a paper look and/or paper feel surface layer can be provided. For example, a paper layer can be sealed onto a thin layer of (bio)film or a thin layer of biofilm or biopolymer can be coated or laminated onto the paper layer. The biopolymer layer can be sealed onto the surface of a tray or container for food, for example. This paper look and/or paper feel surface layer contributes to the consumer's appreciation of the packaging unit according to such embodiment of the invention. Tests have shown a good wet strength and barrier properties. Barrier properties may include oxygen and/or grease barriers. It is believed that the oxygen barrier properties are achieved by the ability of MFC to form a dense network involving hydrogen bonds. Optionally, some hydrophobic elements are added to an MFC layer to further improve the water barrier properties. This may involve modification of the hydroxyl groups, for example on the surface of the micro fibrils chemically and/or by absorption of polymers, for example.

A further advantage of the use of MFC is the improved printability, including digital printing possibilities. In addition or as an alternative, MFC may reduce cost by reducing the weight or grammage by increasing the amount of fillers. This may also enhance the optical properties. It will be understood that combinations of MFC and/or biodegradable aliphatic polyesters may further improve the mentioned effects and advantages. Also, combinations with conventional polymer films, for example by coating MFC and/or a biodegradable aliphatic polyester thereon, may provide a product with the advantages of both types of material.

In a preferred embodiment of the invention the method further comprises the step of producing a foamed pulp material.

Producing a foamed pulp material enables the manufacturing of a foamed packaging unit and comprises the additional steps of:
- preparing a foamed mouldable fiber material comprising a biomass fiber material and a foaming agent;
- moulding a raw packaging unit from the foamed mouldable fiber material, wherein the solid content of the raw packaging unit is above 35% by weight; and
- in-mould drying the raw packaging unit to the foamed packaging unit.

According to the manufacturing method in this embodiment of the invention the foamed moulded fiber material comprises a moulded pulp with biomass fiber material and a foaming agent. The fiber material may relate to non-wood biomass fiber material and/or conventional mouldable pulp material originating from recycled paper or any other origin. The mouldable pulp material is foamed with the aid of the foaming agent. This provides a foamed mouldable pulp that can be used for forming a packaging unit in the manufacturing process according to the present invention.

After moulding a raw packaging unit from the foamed moulded (non-wood biomass) fiber material a drying process step is performed. The manufacturing process according to the invention with foamed moulded pulp material results in a raw packaging unit having a much lower solid content after forming and before drying as compared to conventional manufacturing process. Therefore, the drying step in a manufacturing method according to the present invention can be performed more effectively. More specifically, the increase of solid content after forming in the method according to the invention significantly reduces the amount of water that needs to be removed in the drying operation, thereby significantly reducing the energy usage in the drying operation resulting in a significantly reduction of the energy costs in the manufacturing method.

A comparison with conventional methods showed that the manufacturing method according to the invention provides a (foamed) raw packing unit from the forming/moulding step that has a solid content that is 4% higher and requires 20% less drying energy and thus expenses as compared to a conventional manufacturing method. Therefore, this significantly improves the cost effective manufacturing of packaging units from (foamed) moulded fiber material.

The in-mould drying step can be performed in the same moulds that are used in the moulding step or can be performed in specific moulds for the drying step. It is also possible to perform the drying process in sub-steps with the use of a number of drying moulds for one or more of these sub-steps. This may further improve product quality of the end product.

As a further effect the foamed packaging unit resulting from the manufacturing method according to the present invention is more homogeneous as compared to conventional packaging units. Also, the surface roughness is significantly decreased as compared to such conventional packaging units. This improves the haptic appearance of the packaging unit as well as the visual appearance that will be appreciated by consumers. Furthermore, the weight of the final product in relation to its strength is also improved. This enables a cost effective manufacturing of a packaging unit from foamed moulded fiber material.

As an even further effect the use of denesting additives, such as paraffin, is prevented or reduced. This is achieved by the reduction in surface roughness such that denesting of the manufactured product is easier.

Due to the use of foamed mouldable fiber material for forming or moulding the packaging units the strength of the packaging unit can be achieved with less material, more specifically less weight. This further reduces the amount of raw material that is required, such as recycled paper or virgin pulp. This further improves the manufacturing method.

In addition to the decreased surface roughness and improved homogeneity of the resulting packaging unit, new designs can be developed having a smaller stacking pitch such that a stack of packaging units may comprise a higher number of packaging units as compared to conventional designs from conventional packaging units. This improves the handling efficiency of the packaging units. This further improves the overall flexibility and freedom in design of packaging units. Also the printing possibilities can be improved by the roughness reduction.

As an even further effect the foamed moulded fiber of the packaging unit can be produced achieving an improved heating insulation, thereby improving protection/insulating the products that are provided in the packaging unit against (varying) outside conditions. This improves keeping the product in the packaging unit that is manufactured according to the present invention.

As a further effect of manufacturing a foamed packaging unit according to one of the embodiments of the invention is that the packaging unit can be provided with a lower carbon footprint. Depending on the application the reduction can be 60-80% as compared to comparable packaging units made of plastic or another material.

According to one of the embodiments according to the present invention, in the preparation step for the foamed moulded fiber material, the fiber material with the consistency of 1-4% (10-40 kg/m$^3$) is provided with 0.2-3% surfactant foaming agent and provided to a foam generator or aerator. For example, such generator uses a high speed rotor and provides an additional supply of air to achieve a foamed moulded fiber material with a density in a range of 300-900 kg/m$^3$, preferably in a range of 400-600 kg/m$^3$. In a presently preferred embodiment the foamed moulded fiber material is transferred to the moulding step as soon as possible to achieve a high quality end product. In experiments it was shown that in some of the preferred embodiments the foamed material had a lifespan that was relatively short to achieve maximum product quality. This lifespan that is expressed as the half-life time for the foamed pulp is in the range of 1-60 seconds, preferably in the range of 2-30 seconds. The foamed material comprises at to about 70% of air and a minimum amount of water. Especially the low amount of water in combination with the relatively short half-life time of the foamed material achieves a higher solid content. Experiments have shown an increase in solid content after the moulding-forming of the raw material product in the range of 1-6% eventually leading to a reduction in required drying energy in the range of 10-25%. In these experiments, the products, specifically egg-cases, are produced with less material (about 10% less) and having a similar bending stiffness, three points bending stiffness of the final product as compared to conventional manufacturing methods. The homogeneity of the material is also improved, thereby contributing to a reduction of the surface roughness due to an improved distribution of fibers over the surface. As a further effect the overall production capacity can be increased with up to 50%.

Optionally, the foamed pulp material is provided with one or more additives and/or agents, preferably one or more of the additives and agents that are mentioned earlier.

The invention also relates to a system for manufacturing a 3-dimensional food packaging unit from a moulded pulp material that is capable of performing the method of the invention.

Such system provides the same effects and advantages as described for the method.

The invention further also relates to a packaging unit from a moulded pulp material having a 3-dimensional shape to provide a food receiving or carrying compartment, wherein the packaging unit is manufactured according to the method of the invention.

Such packaging unit provides the same effects or advantages as described for the method and/or system.

Preferably, the packaging unit relates to a food packaging unit and comprises one of a bottle divider, a cup, an egg packaging, a lid, a tray or a box.

BRIEF DESCRIPTION OF THE DRAWINGS

Further advantages, features and details of the invention are elucidated on the basis of preferred embodiments thereof, and reference is made to the accompanying drawings, in which:

FIG. 1 depicts a flow diagram of an example process in accordance with one or more illustrative aspects discussed herein.

Process 1002 (FIG. 1) starts with providing the non-wood biomass material in mowing step 1004 and pretreating step 1006 to remove sand and other rejects, for example. In silage step 1008 the preferred non-wood biomass fiber material, such as (natural) grass, is stored and dried. When the biomass material is required for further manufacturing, the biomass fibers are provided to washing step 1010 that may include a wetting process.

In the illustrated embodiment the washed biomass material provided to an (inclined) dewatering screw in dewatering step 1012 to provide a biomass material with a dry content of about 15 wt %. Thereafter, the screwing press step 1014 further dries the biomass material to a dry weight content of about 25-35-wt %. The material is then provided to fibrillation/extrusion step 1016 with optionally mixing of other materials such as wood fibers or additional agents in mixing step 1018, such as bleaching agents and/or CaO that neutralises fatty acids and/or odours that are present in the biomass material. The resulting pulp material has a dry matter content in a range of 60-90 wt % and a protein content of about 15 wt %. The pulp material is stored and/or transported in transport step 1020. Next, the pulp material is provided to a moulding process 1022. Optionally, the pulp material is directly used in moulding operation 1022. After the moulding operation 1022 involving moulding, releasing and drying, the resulting 3-dimensional food packaging unit is used to store, transport and/or display products 1024, particularly food products.

Experiments have been performed that show the possibilities of using non-wood biomass material in combination with extrusion step 1016. For example, the use of 50 wt % rape seed in the biomass fiber material showed good manufacturing possibilities and improved the sustainability effect of the resulting packaging unit.

Next, examples of 3-dimensional packaging units will be shown that can be manufactured in a process involving the method according to one of the embodiments of the invention.

Figure 2A:
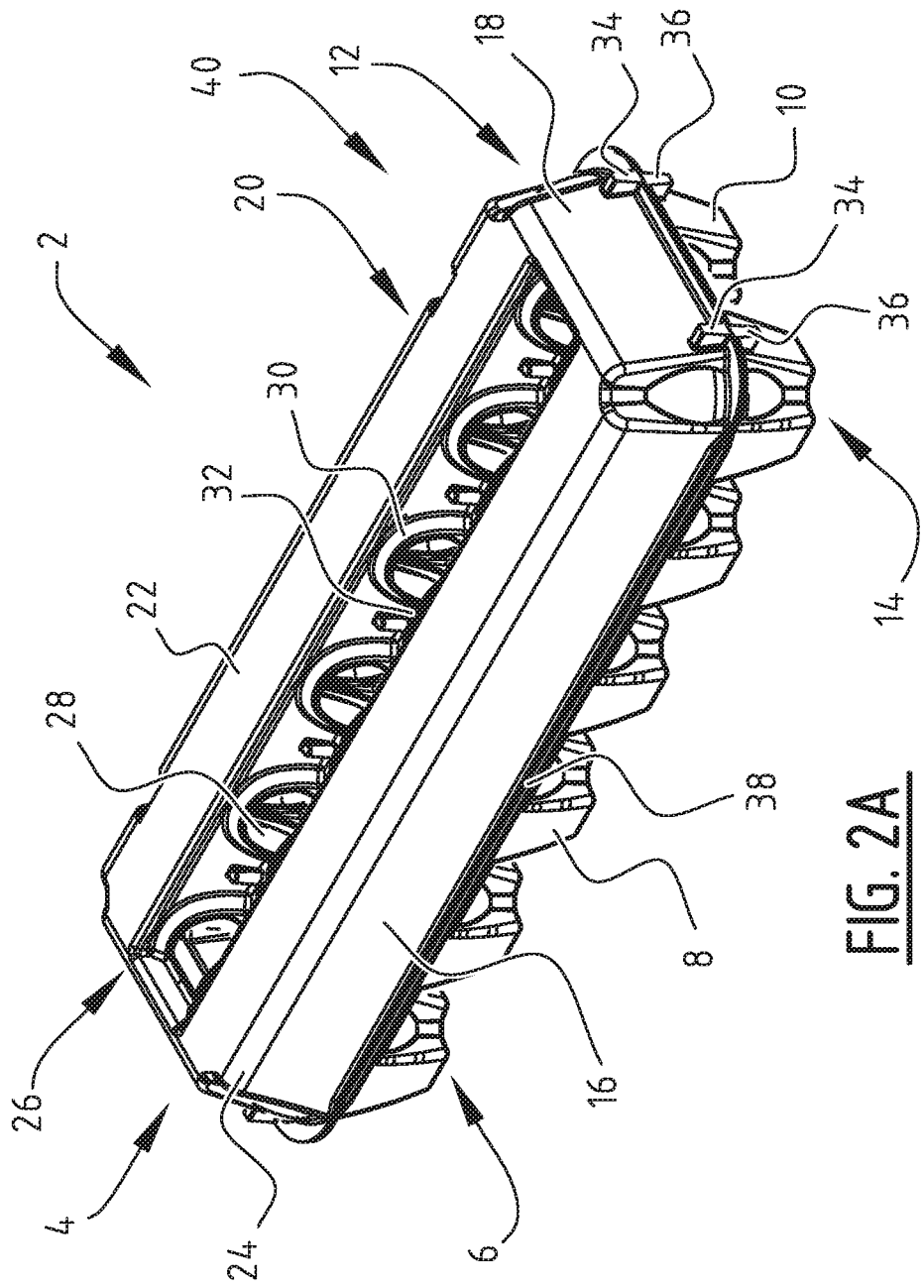
FIG. 2A is a perspective view of a packaging unit manufactured with the process of FIG. 1.
Figure 2B:
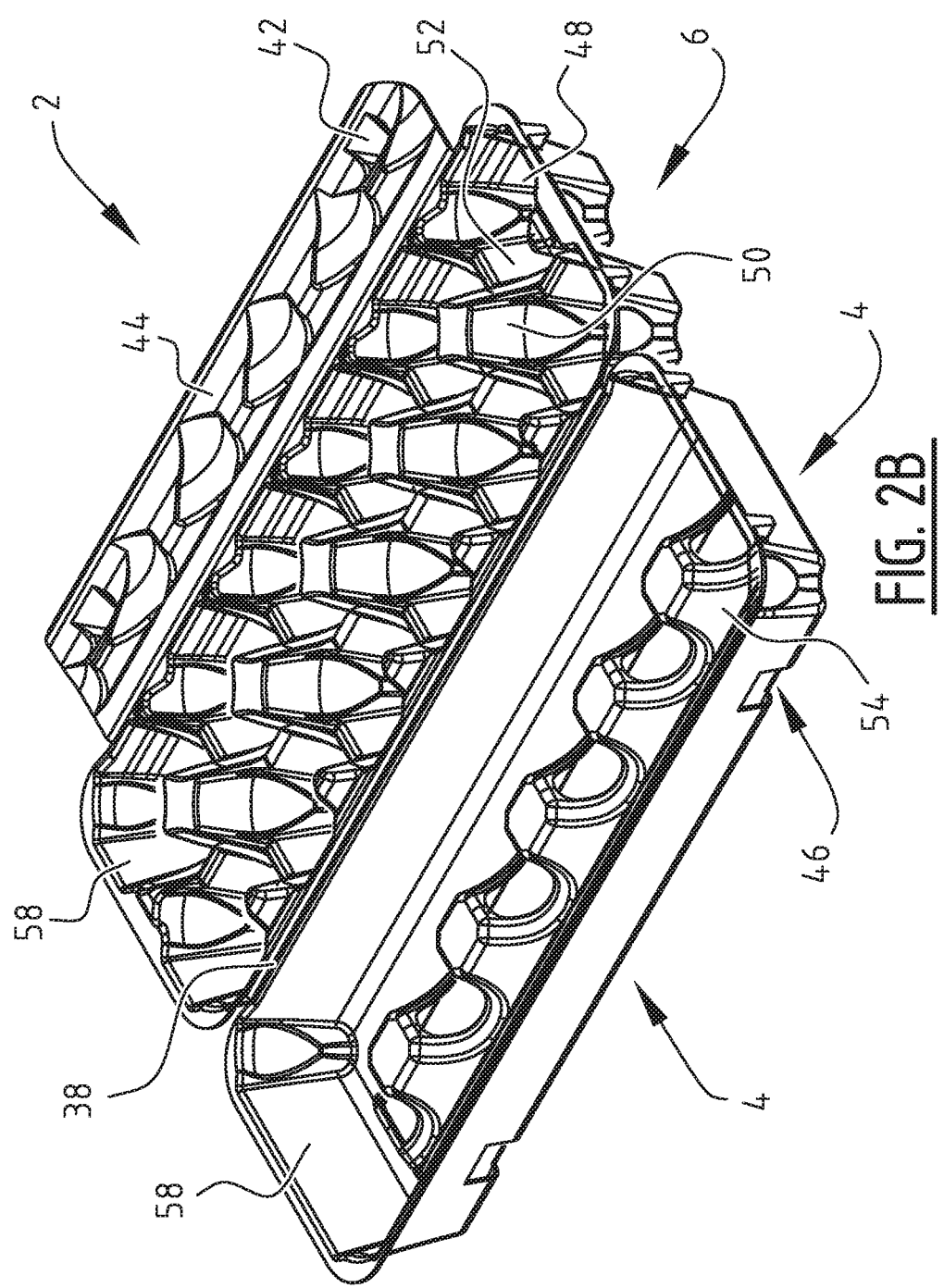
FIG. 2B is a perspective view of an alternative embodiment of a packaging unit manufactured with the process of FIG. 1.

Packaging unit 2 (FIGS. 2A and B) carries or holds eggs and comprises cover part 4 and bottom part 6. Bottom part 6 is provided with back surface 8, sides 10 and front surface 12, and bottom surface 14. Cover part 4 is provided with back surface 16, side surfaces 18, front surface 20 and top surface 22. In the illustrated embodiment transition 24 is provided between top surface 22 and back and front surfaces 16, 20.

In the illustrated embodiment, top surface 22 of cover part 4 is provided with groove 26 comprising a number of openings 28. Openings 28 are defined by two adjacent arch-shaped edges 30, 32 having a larger thickness as compared to the average thickness of cover part 4.

Side surfaces 18 of cover part 4 are provided with denest nocks or denest elements 34. In the illustrated embodiment, bottom part 6 is provided with similar elements 36 mirroring denest elements 34. Hinge 38 connects back surface 16 of cover part 4 with back surface 8 of bottom part 6. Lock 40 comprises nose-shaped lock element 42 that is connected to flap 44 of bottom part 6. Cover part 4 is provided with openings 46 that capture lock elements 42 therewith defining lock 40.

In the illustrated embodiment, bottom part 6 is provided with a number of product receiving compartments 48, cones 50 and separating walls 52. Cone 50 extends from the bottom of bottom part 6 in an upward direction. Cover part 4 comprises cone support 54. Inner surface 58 of packaging unit 2 comprises PBS and/or PLA material, optionally as film layer or alternatively blended and/or integrated with the fibers of the moulded pulp material.

In the illustrated embodiment, packaging unit 2 comprises twelve product receiving compartments 48 that are provided in two rows of six compartments 48. Individual compartments 48 are separated from each other by walls 52 and cones 50. It will be understood that other configurations can also be envisage in accordance to the invention.

Packaging unit 2 may also be configured to receive other products, such as tomatoes, kiwis.

Figure 3:
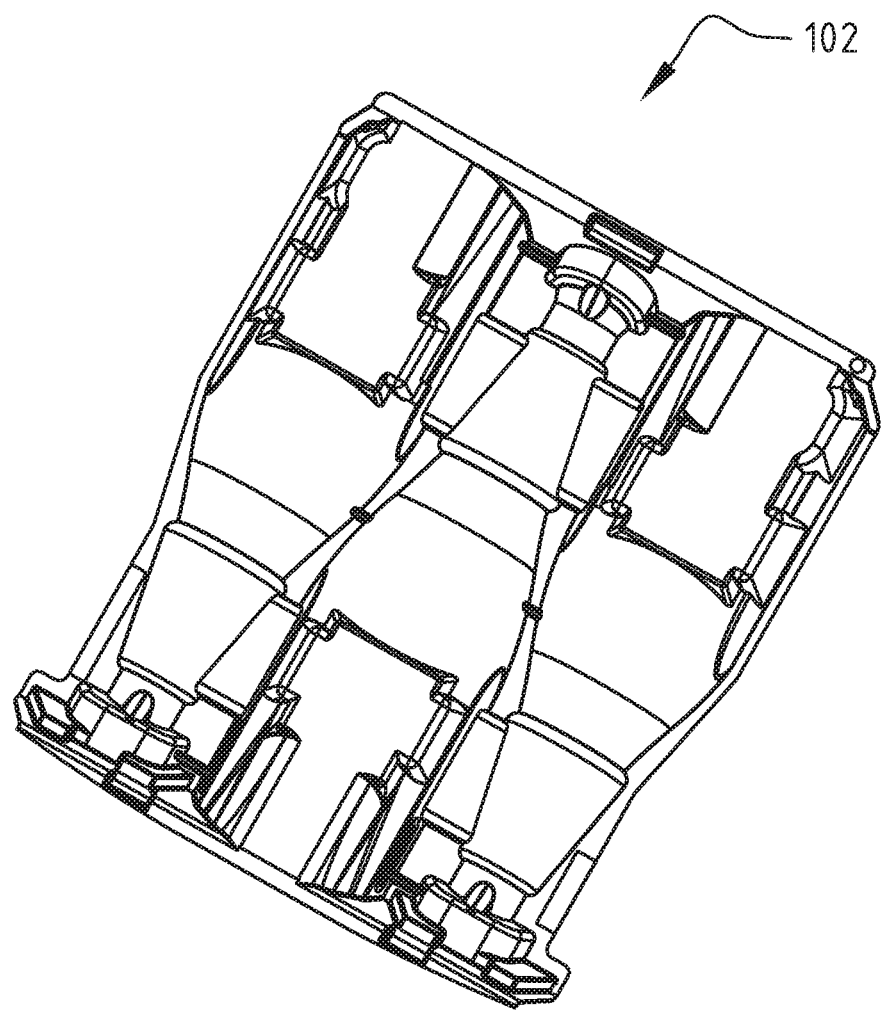
FIG. 3 is a perspective view of a packaging unit in the form of a bottle divider manufactured with the process of FIG. 1.

It will be understood that other types of food packaging units can also be envisaged in accordance with the present invention. As a further example, bottle divider 101 (FIG. 3) is illustrated. Also, bottle divider 102 may comprise a film layer of PBS (and/or appropriate alternative biodegradable aliphatic polyester) and/or may comprise an amount of PBS that is blended into the moulded pulp.

Figure 4A:
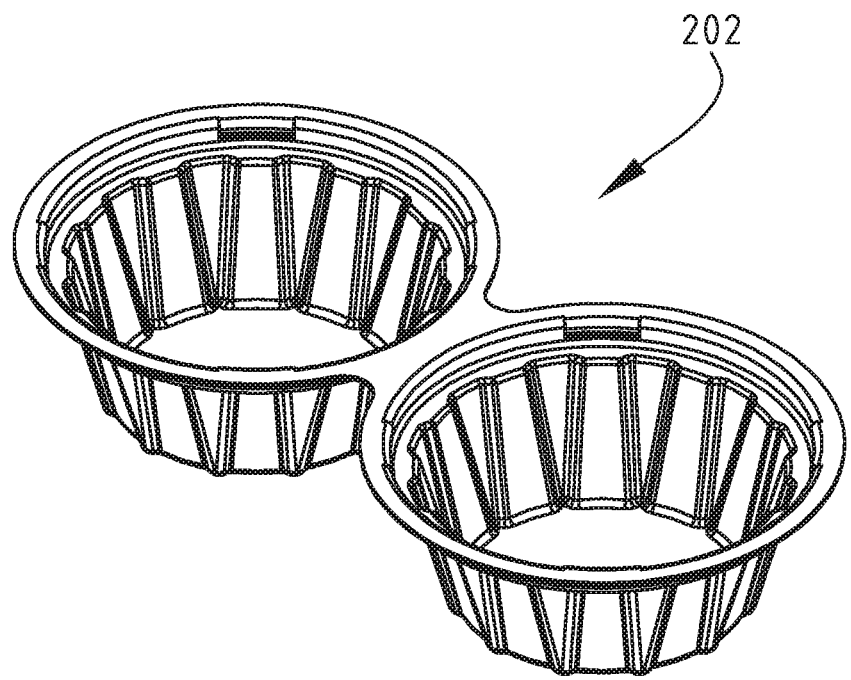
FIG. 4A is a perspective view of a packaging unit in the form of a cover manufactured with the process of FIG. 1.
Figure 4B:
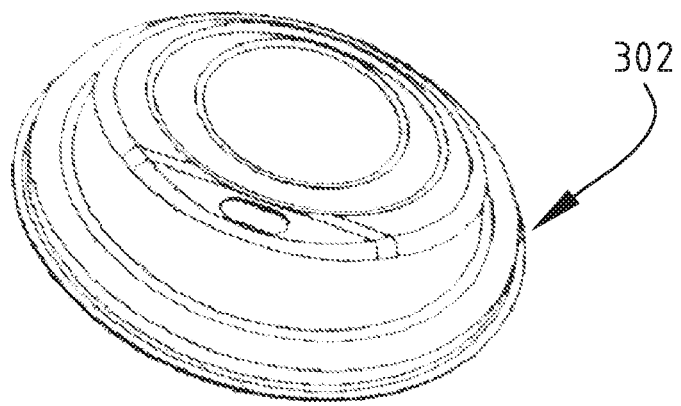
FIG. 4B is a perspective view of a packaging unit in the form of a sip lid manufactured with the process of FIG. 1.

A further example in accordance with the present invention is cover 202, for example for an ice cup. Another example of a packaging unit according to the invention is sip lid 302 (FIGS. 4 A and B). Cover 202 and sip lid 302 comprise a film layer of biodegradable aliphatic polyester and/or may comprise an amount of biodegradable aliphatic polyester that is blended into the moulded pulp. This renders cover 202 and sip lid 302 water or liquid repellent. One of the further advantages of the use of biodegradable aliphatic polyester is the reduction or prevention of the liquid entering or migrating into the sip lid material during use. Another advantage is the constancy of size or dimensional stability. In this specific case this prevents sip lid 302 loosening from a cup or beaker for hot beverages such as coffee, tea or soup, or cold beverages such as carbonated drinks, and cup 202 from loosing from an ice cup, for example. It will be understood that such lids 302 can also be applied to other food containers. For example, lids 302 can be applied to containers for milkshakes, for example. Further details and examples of lids 302 are disclosed in WO 2010/064899, including embodiments with specific flanges and notches.

Sip lid 302 is preferably coated with a biodegradable aliphatic polyester liner, such as a PBS liner. As mentioned, sip lids 302 can be used for cups and milkshakes. Also, sip lids can be applied to so-called ready meal trays (for example for pizza, wraps, fish, meat, lobster, pasta, . . . ) and act as a (digital) printable and barrier seal, for example.

Figure 5A:
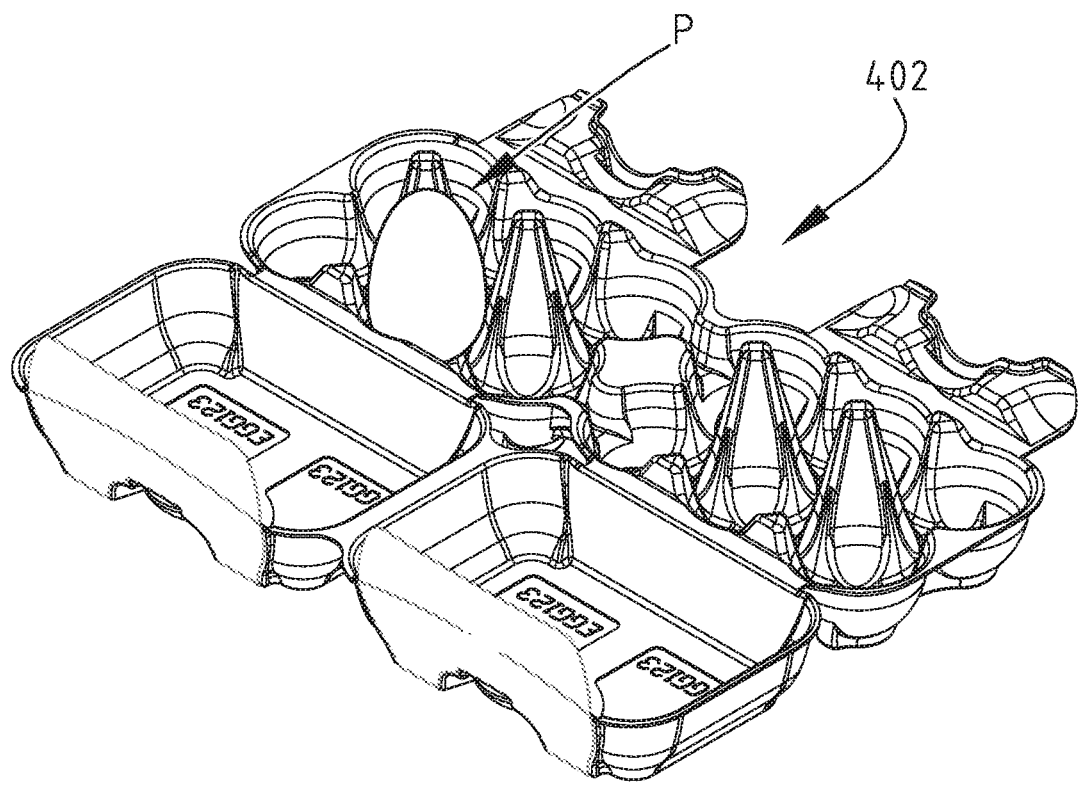
FIG. 5A is a perspective view of another alternative embodiment of a packaging unit manufactured with the process of FIG. 1.
Figure 5B:
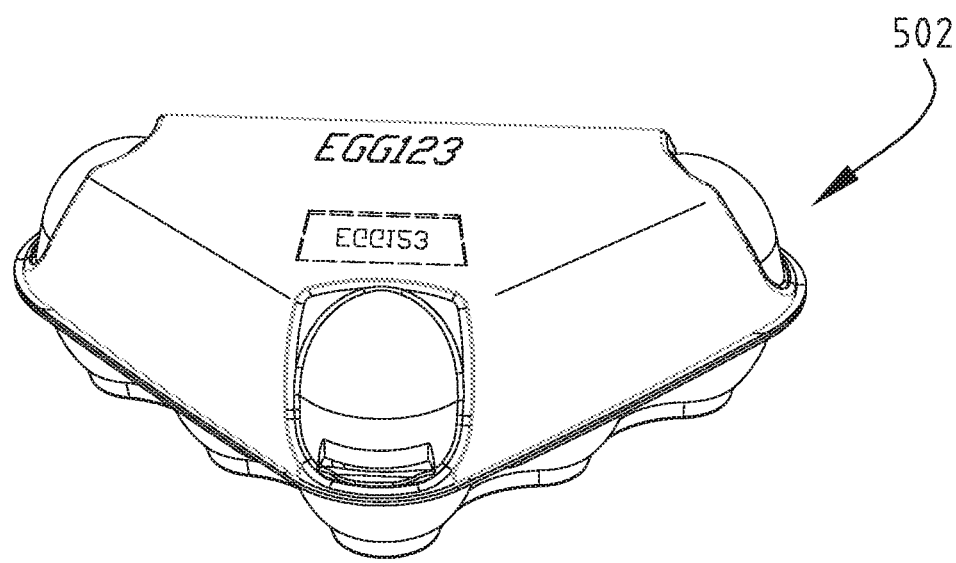
FIG. 5B is a perspective view of a further alternative embodiment of a packaging unit manufactured with the process of FIG. 1.

It will be understood that other designs for packaging units in accordance with the invention can be envisaged. For example, containers 402, 502 (FIGS. 5A and B) illustrate different designs for egg cartons capable of holding eggs P.

Other examples of food packaging products may relate to cup carriers, cups, plates and other table ware etc.

Figure 6:
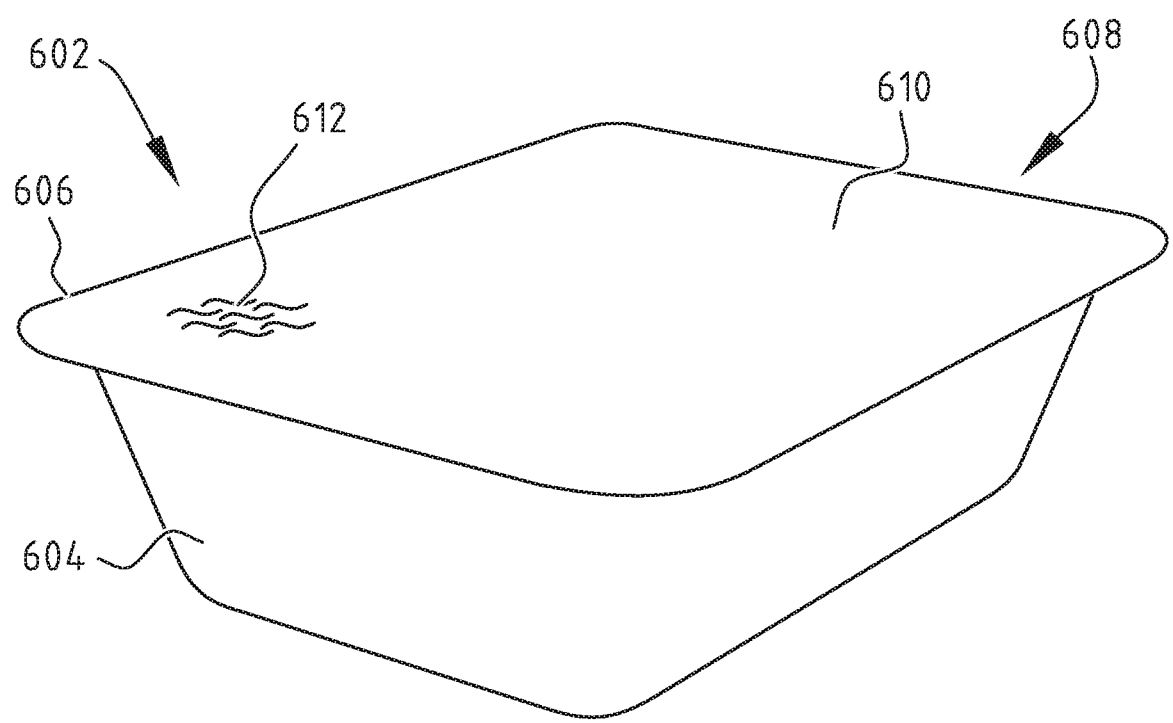
FIG. 6 is a perspective view of another alternative embodiment of a packaging unit manufactured with the process of FIG. 1.

Packaging unit 602 (FIG. 6) comprises bottom part 604 and cover part 606. Unit 602 is provided with biodegradable aliphatic polyester, such as PBS and/or PLA, and is capable of holding an amount of ice cream. Cover part 606 comprises top seal 608 of a (paper) label whereon layer or film 610 of biodegradable aliphatic polyester(s) is provided. Optionally, fibers 612 are included in the cover part 606. This improves the possibilities for giving the unit a natural paper feel and/or look. This may also be applied to other type of packaging units, for example, in instant or ready-to-eat meals, such that conventional sleeves can be omitted from the packaging units. This enables a more cost-efficient packaging unit with a possible weight reduction.

When manufacturing a food packaging unit 2, 102, 202, 302, 402, 502, 602 a moulded pulp material is prepared. Optionally, an amount of biodegradable aliphatic polyester, such as PBS, is blended or mixed into the moulded pulp material and/or an amount of PBS is included in a separate layer that is provided in or on unit 2, 102, 202, 302, 402, 502, 602. Such separate layer may come into contact with a food product. Next, the raw unit is moulded. Optionally, the raw unit is dried in the mould applying an in-mould drying process. Finally the product is released from the mould. Several post-moulding operations may optionally be performed in relation to unit 2, 102, 202, 302, 402, 502, 602 optionally including, but not limited to, labelling including in-mould labelling, marking including printing and digital printing, testing. In several of the preferred embodiments, the compostable biofilm is at least arranged on the food contact area of the product containing part of the packaging unit. In preferred embodiments this film is capable of being used in a microwave or oven as a so-called ovenable film. Preferably, the biofilm is capable of withstanding temperatures up to 170° C., 190° C., or even higher. This biofilm preferably comprises an amount of PBS and/or MFC and/or biodegradable aliphatic polyester that may comprise an amount of one or more of PHB, PHA, PCL, PLA, PGA, PHBH and PHBV. Especially a combination of a compostable packaging unit involving in-mould drying further improves the sustainability as compared to conventional packaging units. The (digital) printable properties enable printing of packaging and/or food characteristics/information. This may obviate the use of separate sleeves, for example. In addition, it enables the application of prints, for example a fish&chips (newspaper) print on the packaging unit.

Experiments have been performed with one or more of the illustrated food packaging units. These experiments involved comparing the "in-use" characteristics of the food packaging units as compared to conventional packaging units, and also the compostable characteristics. An amount of a biodegradable aliphatic polyester was added to the moulded pulp material and a refining step was performed. Measurements were done at a temperature of about 23° C. and a relative humidity of about 50%. Measurements involved a compression test. This showed a significant improvement in compression value. For example, a packaging unit manufactured from biomass originating from rapeseed straw with an amount of PLA showed a compression value that is about twice that of a conventional products under the same or similar conditions, even in the presence of sub-optimal conditions with a relatively high RH.

Further tests with an extruder having a one or more flushing and/or dewatering units showed a reduction in smell and dust production in the manufacturing process. In tests with grass fibers the dry solids content was 3-5% higher as compared to the dry solids content in conventional manufacturing processes with the biomass fibers. This enabled reduction of the drying temperature with about 20-50° C. or a reduction of the required drying period with 10-15%. This improves efficiency and reduces energy consumption. In addition, the tests showed a significant reduction of undesired colouring in the drying process.

Other tests were performed to show the dual ovenable (oven and microwave) performance of the packaging unit according to the invention. In the experiments a laminated product with a film of a biodegradable aliphatic polyester (PBS/PLA and/or PHBH) was heated to a temperature of about 190° C. for about 30 minutes. Results show that the film layer remains intact and does not melt. Furthermore, the strength and stability of the packaging unit were not significantly affected. As a further effect, the packaging unit was more stable in view of twisting when removing the packaging unit from the oven as is often the case with conventional packaging units. Furthermore, the packaging unit of the invention showed a limited temperature increase to about 50-70° C., while the conventional units reached a temperature of about 90-100° C. under similar conditions. Other experiments with a PHBH film that is laminated on the inside of a (food) tray shows an even improved heat resistance when heating the tray to a temperature of 180-200° C., and in addition shows (an improved) oil, acid and moisture resistance/repellence.

In still further tests other characteristics were examined. It was shown that wipeability of the packaging unit could be improved. Further improvements where shown by addition of further additives.

The present invention is by no means limited to the above described preferred embodiments thereof. The rights sought are defined by the following claims within the scope of which many more modifications can be envisaged. For example, the packaging unit that is manufactured according to the presented method can be applied to eggs and other vulnerable food and/non-food products as well as to other products. Non-limiting examples of products include eggs, vegetables, fruit, electronic products such as DVD, radios, displays, mobile phones, tablets etc.

The invention claimed is:

1. A method for manufacturing a 3-dimensional food packaging unit from a moulded pulp material, the method comprising the steps of:
   preparing a pulp material, comprising the steps of:
      providing an amount of biomass with non-wood biomass fibers as a raw material;
      preparing the biomass fibers;
      fibrillating the prepared biomass fibers with an extruder to produce the pulp material with biomass fibers, wherein extruding the prepared biomass fibers comprises the step of flushing the fibers;
   providing the pulp material to the moulding device;
   moulding the 3-dimensional food packaging unit; and
   releasing the 3-dimensional food packaging unit from the mould.

2. The method according to claim 1, wherein preparing the pulp material with biomass fibers comprises the step of providing biomass from silage with a dry matter content in the range of 25-50 wt %.

3. The method according to claim 1, wherein preparing the biomass fibers comprises washing the biomass fibers and dewatering the washed biomass fibers.

4. The method according to claim 3, wherein the dewatering comprises a dewatering step and a pressing step.

5. The method according to claim 3, wherein after the dewatering step the dry matter content is in the range of 10-20 wt %, preferably about 15 wt %.

6. The method according to claim 3, wherein after the pressing step the dry matter content is in the range of 20-40 wt %.

7. The method according to claim 1, wherein the extruding of the prepared biomass fibers comprises the step of flushing the fibers.

8. The method according to claim 7, wherein the extruding of the prepared biomass fibers comprises the step of collecting the residual material.

9. The method according to claim 8, wherein the residual material is supplied to a reactor configured for producing biogas.

10. The method according to claim 1, wherein the extruding of the prepared biomass fibers provides the pulp material with a dry matter content in the range of 50-95 wt %.

11. The method according to claim 1, wherein the protein content of the produced pulp material is in the range of 1-20 wt %.

12. The method according to claim 1, wherein biomass fibers originate from one or more of plants of the Order Poales, the Order Solanales, the Order Arecales, the Order Malphighiales, the Order of Rosales, the Order of Malvales and/or herbaceous plants.

13. The method according to claim 1, wherein the biomass comprises biomass originating from plants of the Family of Poaceae.

14. The method according to claim 1, further comprising the step of providing the biomass fibers by mixing non-wood biomass fibers and virgin wood fibers.

15. The method according to claim 1, further comprising the step of providing a biofilm comprising a biodegradable aliphatic polyester.

16. The method according to claim 15, wherein the aliphatic polyester comprises an amount of one or more of: PHB, PHA, PBS, PCL, PLA, PGA, PHBV and/or PHBH.

17. The method according to claim 1, further comprising the step of producing a foamed pulp material.

* * * * *